(12) United States Patent
Nakamura

(10) Patent No.: US 8,178,839 B2
(45) Date of Patent: May 15, 2012

(54) METHOD, DEVICE AND PROGRAM FOR ESTIMATING PARTICLE EMITTED FROM RADIOISOTOPE SOURCE, METHOD FOR ESTIMATING RADIATION DETECTOR, METHOD AND DEVICE FOR CALIBRATING RADIATION DETECTOR, AND RADIOISOTOPE SOURCE

(75) Inventor: Hidehito Nakamura, Chiba (JP)

(73) Assignee: National Institute of Radiological Sciences, Chiba-shi (JP)

( * ) Notice: Subject to any disclaimer, the term of this patent is extended or adjusted under 35 U.S.C. 154(b) by 539 days.

(21) Appl. No.: 12/309,888

(22) PCT Filed: Oct. 22, 2008

(86) PCT No.: PCT/JP2008/069160
§ 371 (c)(1),
(2), (4) Date: Feb. 2, 2009

(87) PCT Pub. No.: WO2009/133639
PCT Pub. Date: Nov. 5, 2009

(65) Prior Publication Data
US 2010/0274512 A1    Oct. 28, 2010

(30) Foreign Application Priority Data
May 2, 2008 (JP) .................. PCT/JP2008/058431

(51) Int. Cl.
*G01N 23/00* (2006.01)
(52) U.S. Cl. ........................................... 250/308

(58) Field of Classification Search ............... 250/252.1, 250/308, 336.1, 362, 374, 375; 702/85, 180
See application file for complete search history.

(56) References Cited

U.S. PATENT DOCUMENTS

| | | | | |
|---|---|---|---|---|
| 3,760,186 A | * | 9/1973 | Staib | 250/305 |
| 4,019,057 A | * | 4/1977 | Bram | 250/375 |
| 4,670,656 A | * | 6/1987 | Bolon | 250/385.1 |
| 2007/0187608 A1 | * | 8/2007 | Beer et al. | 250/362 |

FOREIGN PATENT DOCUMENTS

| JP | A-2004-221082 | 8/2004 |
|---|---|---|
| JP | A-2006-275664 | 10/2006 |

(Continued)

OTHER PUBLICATIONS

Sanchez et al., "An experimental study of symmetric and asymmetric peak-fitting parameters for alpha-particle spectrometry," *Nuclear Instruments and Methods in Physics Research* A 339, pp. 127-130, 1994.

(Continued)

*Primary Examiner* — David Porta
*Assistant Examiner* — Marcus Taningco
(74) *Attorney, Agent, or Firm* — Oliff & Berridge, PLC

(57) ABSTRACT

When an energy of a particle emitted from a radioisotope source is obtained by a detector, a histogram obtained from a relationship between a difference ΔE between an energy of a particle emitted outside the radioisotope source and an initial energy which the particle possesses at the time of generation and a count is treated as being asymmetric, and an energy distribution (L1) of the particle emitted outside the radioisotope source is obtained, thereby allowing an energy calibration of a radiation detector, absolute quantitation and resolution measurement to be performed with accuracy.

20 Claims, 15 Drawing Sheets

FOREIGN PATENT DOCUMENTS

JP   A-2007-263804   10/2007

OTHER PUBLICATIONS

Miyajima et al., "Numbers of Scintillation Photons Produces in NAI(TL) and Plastic Scintillator by Gamma-Rays," *IEEE Transactions Nuclear Sciences*, vol. 4, No. 4, 1993.

Bland et al., "An Observed Correlation between Alpha-Particle Peak-fitting Parameters," *Applied Radiation and Isotopes*, vol. 43, No. 1/2, pp. 223-227, 1992.

Bortels et al., "Analytical Function for Fitting Peaks in Alpha-Particle Spectra From Si Detectors," *Applied Radiation and Isotopes*, vol. 38, No. 10, pp. 831-837, 1987.

Bland et al., "Deconvolution of Alpha-Particle Spectra to Obtain Plutonium Isotopic Ratios," *Applied Radiation and Isotopes*, vol. 43, No. 1/2, pp. 201-209, 1992.

Roldan et al., "Monte Carlo simulation of alpha spectra in low-geometry measurements," *Nuclear Instruments and Methods in Physics Research A* 338, pp. 506-510, 1994.

Ferrero et al., "Backscattering and Self-Absorption Corrections in the Measurement of Alpha-Emitters in $2\pi$ Geometry," *Nuclear Instruments and Methods in Physics Research A* 286, pp. 384-387, 1990.

Klein et al., "Energy and Angle Straggling Effects in a $D(d,n)^3He$ Neutron Source Using a Gas Target," *Nuclear Instruments and Methods* 193, pp. 635-644, 1982.

Porter et al., "Stopping Power of Polystyrene for 2.2 to 5.9 MeV Protons," *Nuclear Instruments and Methods* 155, pp. 25-28, 1978.

English-language translation of Office Action issued in JP 2009-505666, issued Apr. 12, 2011.

\* cited by examiner

METHOD, DEVICE AND PROGRAM FOR ESTIMATING PARTICLE EMITTED FROM RADIOISOTOPE SOURCE, METHOD FOR ESTIMATING RADIATION DETECTOR, METHOD AND DEVICE FOR CALIBRATING RADIATION DETECTOR, AND RADIOISOTOPE SOURCE

TECHNICAL FIELD

The present invention relates to a method, a device and a program for estimating a particle emitted from a radioisotope source, a method and a device for calibrating a radiation detector, and a radioisotope source, and in particular, a method, a device and a program for estimating a particle capable of estimating an energy that is lost while a particle passes through a radioisotope source, which has been disregarded conventionally, and estimating a particle energy with accuracy, and a method and a device for calibrating a radiation detector using the same, and a radioisotope source.

BACKGROUND ART

Generally, as exemplified in FIG. 1, a charged particle (helium nucleus or electron) 8 constituting alpha particles or beta particles and passing through a substance 6 loses its energy ($\Delta E$) in the substance 6 due to interaction with the substance 6. The loss $\Delta E$ is proportional to a type, a density and a thickness (t) of the substance.

On the other hand, the use of radioisotope sources has been increasing recently for calibration of radiation detectors and biological experiments, etc., in the fields of science, biology, chemistry, medical science and others. Further, based on the results of these studies and experiments, comparisons of other radiation doses and energies are performed. Thus, an energy, a dose or the like of a particle emitted from a radioisotope (hereinafter, simply referred to as an isotope) needs to be estimated accurately.

A radioisotope source (for example, 137Cs, 207Bi, 109Cd, 110mAg, 90Sr, etc.) emitting charged particles such as monoenergetic internal conversion electrons, beta particles, and the like is covered with a film in order to protect an isotope from external injury. Further, a thin film has been used to reduce an energy deposit of the charged particles in the film. Thus, a variety of studies and experiments have been conducted based on the assumption that the energy deposit in the thin film can be disregarded.

As an example of a thin film source 10, a 137Cs thin film source is shown in FIG. 2. 12 denotes an isotope composed of, for example, 137Cs and 14 denotes a thin film composed of, for example, aluminum in FIG. 2.

Conventionally, as shown in FIG. 3, measurements have been performed, for example, by a radiation detector 20 constituted by a scintillation detector (a detector composed of a scintillator and a photomultiplier device), a semiconductor detector, a gas detector, etc., regarding a hundred percent energy E as having been emitted from the source 10 without any loss.

However, results of a study by the present inventor have revealed that a charged particle 8 in fact lost an energy $\Delta E$ in the source 10 before getting out of the source 10, in accordance with its occurrence location 13 and emission direction, as shown in FIG. 4 and FIG. 5.

Conventionally, various efforts such as adjusting a radiation rate of radiation from a radioisotope source as described in Japanese Published Unexamined Patent Application No. 2004-221082, alleviating an influence of source fluctuations as described in Japanese Published Unexamined Patent Application No. 2006-275664 and measuring a radiation dose of a measuring object with accuracy as described in Japanese Published Unexamined Patent Application No. 2007-263804 have been made. However, an energy deposit within a radioisotope source has not received attention.

On the other hand, A. Martin Sanchez, et al., "An experimental study of symmetric and asymmetric peak-fitting parameters for alpha-particle spectrometry" Nuclear instruments and Methods in Physics Research A 339 (1994) 127-130 (hereinafter, referred to as literature 1) states that attention is given to an energy deposit within a radioisotope source. However, in a frequency distribution chart of energy intensity and frequency of counts of a particle group emitted from a radioisotope source (hereinafter, referred to as an energy distribution where its x-axis indicates energy intensity and its y-axis, frequency of counts) as shown in FIG. 6, a distribution (L1) based on an energy deposit of the particle within the radioisotope source 10 and a statistical fluctuation (L2) of the detector 20 are both treated as being symmetrical. As a result, an asymmetric energy spectrum (L3) obtained by an operation processing part 30 in actual measurement was not able to be expressed only by synthesizing the symmetric L1 and L2. Thus, L3 was reproduced as an asymmetric energy spectrum by adding an exponential function to the synthesis of the energy spectra of L1 and L2. However, there was no physical basis for the exponential function at all, and only an approximate estimation with the spectrum reproduced was conducted. Accordingly, an accurate estimation was not achieved. There are four serious mistakes in the method, including (1) the energy deposit of the particle within the radioisotope source is treated as being symmetric, (2) in spite of the fact that the particle loses its energy within the radioisotope source, an energy of the particle actually emitted outside the radioisotope source is treated as being equal to the initial energy which the particle possesses at the time of generation, (3) the exponential function having no physical basis is introduced only for forcibly expressing the asymmetry and (4) the performance of the radiation detector is not estimated with accuracy due to the introduction of the exponential function.

Further, in a conventional analytical method as in M. Miyajima, et al., "Numbers of scintillation photons produced in NaI (Tl) and plastic scintillator by gamma-rays.", Published in IEEE Trans. Nucl. Sci. 40: 417-423, 1993 (hereinafter, referred to as literature 2) for example, an influence of the energy deposit within the radioisotope source was not estimated, and accordingly, energy calibration of the detector is incorrect. It can be found from an energy spectrum of a 976 keV internal conversion electron emitted from a 207Bi radioisotope source, having been measured by a radiation detector (plastic scintillator) as shown in FIG. 5 of the aforementioned literature 2 that an energy distribution of the 976 keV internal conversion electron having been emitted from the 207Bi radioisotope source is treated as being symmetric. As a result, the performance of the radiation detector was also estimated low.

Moreover, the internal conversion electron is treated as having only one level of energy without estimating internal conversion electrons having several different levels of energy (internal conversion electrons from K shell, L1 shell, L2 shell, L3 shell, M shell, etc.) in terms of excitation level of one nucleus. Thus, it is understood that the performance of the radiation detector is estimated lower.

Further, separation of 'alpha particles' having several different levels of energy is performed based on a result obtained by measurement in C. John Bland et al., "An Observed Correlation between Alpha-Particle Peak-fitting Parameters", vol. 43, No. 1/2, pp. 223-227, 1992 (hereinafter, referred to as literature 3), G. Bortels et al., "ANALYTICAL FUNCTION FOR FITTING PEAKS IN ALPHA-PARTICLE SPECTRA FROM Si DETECTORS", Applied Radiation and Isotopes, vol. 38, no. 10, pp. 831-837, 1987 (hereinafter, referred to as literature 4) and C. John BLAND et al., "Deconvolution of Alpha-Particle Spectra to Obtain Plutonium Isotopic Ratios", Applied Radiation and Isotopes, vol. 43, no. 1/2, pp. 201-209, 1992 (hereinafter, referred to as literature 5). Separation is possible only because the measurement result of the alpha particles is matched with an approximate formula using the exponential function. For beta particles or gamma rays, for example, a result obtained by measurement cannot be expressed by an exponential function, and accordingly separation between different particles is impossible. From around 1970 until now, a great number of papers on and techniques about separating alpha particles as described above have been reported around the world. However, there have been no reports of any document ever estimating a type of particle. This is because they are not applicable to a particle other than alpha particles. Further, although it is said that the separation of alpha particles having different levels of energy is possible, there is a disadvantage that errors are large and measurement accuracy is remarkably low since approximation having no physical basis is repeated relative to a plurality of alpha particles.

DISCLOSURE OF THE INVENTION

The present invention was made based on such findings, and accordingly an object of the present invention is to estimate an energy deposit of a particle within a radioisotope source with accuracy which has been disregarded conventionally, thereby obtaining that an energy of a particle emitted outside the radioisotope source is lower than an initial energy the particle possesses at the time of generation and that an energy distribution of the particle emitted outside the radioisotope source is asymmetric, thereupon estimating an energy of the particle emitted from the radioisotope source with accuracy. The present invention has the potential for rewriting the history of conventional radiation measurement with the use of a particle emitted from a radioisotope source and performance estimation of radiation detectors which has been performed.

The present invention finds, as an energy distribution shown in FIG. 7(A), that an energy distribution L1 of a particle becomes asymmetric due to an energy deposit within the radioisotope source 10. When allowing the synthesis of an energy spectrum of the energy distribution L1 and an energy spectrum of the statistical fluctuation L2 (symmetry) of the detector 20 to be a solution, the present invention obtained a result of being in agreement with an energy spectrum of an asymmetric actual measurement value L3 in the operation processing part 30.

Even with a thin radioisotope source, a particle slightly loses its energy due to interaction if traveling inside a substance. When a particle is generated within the radioisotope source, the particle possesses an initial energy Ei. However, an energy E of the particle actually emitted outside the radioisotope source becomes slightly smaller than the initial energy Ei. This is because the particle loses its energy in the radioisotope source. An energy amount that is lost in the radioisotope source depends on a distance where the particle passes through inside the radioisotope source, which is naturally determined from an occurrence location and an emission direction of the particle. In FIG. 7(A), ΔE indicates the most probable of an energy which the particle having been emitted from the radioisotope source loses in the radioisotope source. Due to the energy deposit in the radioisotope source, an energy distribution of a particle group actually emitted outside the radioisotope source has the most probability of an energy that is shifted to a value (Ei−ΔE) obtained by subtracting the energy ΔE having been lost in the radioisotope source from the initial energy Ei.

In FIG. 7(B), a detection part 20 is constituted by an interaction part 201 and a photomultiplier part 202, and an operation output part 30 is constituted by an operation part 301 and an output part 302. The interaction part 201 is typically a scintillator, and the photomultiplier part 202 is typically a photomultiplier tube. A signal photoelectrically converted by the photomultiplier part 202 is processed by the operation part 301 that is constituted by a CPU, a memory, and a program. The signal is output via an interface of the output part 302. Further, S1 in FIG. 6 and FIG. 7 denotes a full width at half maximum.

Now, the relationship between an emission angle of a particle generated in a radioisotope source and an energy distribution of a particle emitted outside the radioisotope source is schematically shown in FIG. 8.

FIG. 8 illustrates loci (a', b', c') of particles emitted from a certain position of the radioisotope source at different emission angles (0 degrees, 15 degrees, 30 degrees) respectively and energy distributions (a, b, c) corresponding to respective particles. Each particle multiply-scatters and travels in the radioisotope source while losing its energy as shown in FIG. 8. Each of ΔE0, ΔE15, ΔE30 and ΔEAVE in FIGS. 8(a) to 8(c) represents the most probable energy loss in the radioisotope source of the particle emitted from the radioisotope source in each direction of 0 degrees, 15 degrees, 30 degrees and an average between 0 and 30 degrees. It is shown that the energy deposit in the radioisotope source is greater as the distance where the particle passes through inside the radioisotope source becomes long. That is, an energy deposit amount of the particle is ΔE0<ΔE15<ΔE30. Further, it can be understood that a more asymmetric energy distribution of the particle group emitted outside the radioisotope source extends as there exist more particles whose travel distance in the radioisotope source is long.

FIG. 8(d) shows the average of the energy distributions of the particle group emitted in the direction of 0 degrees, 15 degrees and 30 degrees as shown herein.

FIG. 9 is a result of an energy spectrum (corresponding to L3 in FIG. 7) where a 976 keV K shell internal conversion electron emitted from a 207Bi radioisotope source is measured by a plastic scintillator. The energy spectrum consists of an energy distribution (fluctuation) (L1 in FIG. 7 and FIG. 8) asymmetric due to the energy deposit of the particle in the source and a symmetric statistical fluctuation of the detector (L2 in FIG. 7). The result shows that a reason why an energy spectrum (L3 in FIG. 7) of the particle energy obtained by the measurement becomes asymmetric is that the energy distribution of the particle emitted outside the source becomes asymmetric due to the energy deposit of the particle in the source.

The present invention solves the aforementioned problems by treating a histogram obtained from a relationship between a difference ΔE between an energy of a particle emitted outside a radioisotope source and an initial energy which the particle possesses at the time of generation and a count as being asymmetric when an energy of a particle emitted from the radioisotope source is obtained by a detector, obtaining an energy distribution (L1) of the particle emitted outside the radioisotope source, and estimating an energy deposited while a particle passes through inside the radioisotope source.

Further, the estimated energy deposit can be calibrated.

Further, the energy deposit within the radioisotope source can be estimated by obtaining a travel distance of a particle in the radioisotope source from an occurrence location and an emission direction of the particle in the radioisotope source.

Further, the travel distance can include a travel distance from the radioisotope source to an interaction part of the radiation detector.

Herein, the emission direction of the particle can be set isotropically (in $4\pi$ direction).

Further, the energy deposit within the radioisotope source can be estimated by using an energy distribution function $F(Ei)$ of the particle emitted outside the radioisotope source, which is obtained by estimation, and a response function $R(E)$ shown by the following formula;

$$R(E) = \int F(E_i) \times \frac{1}{\sqrt{2\pi}\,\sigma} e^{\frac{-(E-E_i)^2}{2\sigma^2}} dE_i \quad (1)$$

where E is an energy of the particle, Ei is an initial energy which the particle possesses at the time of generation, and $\sigma$ is a standard deviation and indicates resolution of the detector.

Further, the energy deposit of the particle within the radioisotope source can be obtained by individually obtaining a distribution function $Fk(E)$ based on an energy deposit within the radioisotope source relative to a group of radiations (internal conversion electrons from each shell, beta particles, gamma rays, etc.) where k is an index for identifying each radiation contained in the group of radiations and indicates the number of radiations, and estimating an emission rate $\tau k$ of each radiation.

Further, the particle can be a charged particle.

Further, the radioisotope source can be a thin film radioisotope source (a radioisotope source emitting an internal conversion electron, etc.), a beta source or an alpha source.

Furthermore, the energy spectrum measured by the radiation detector is calibrated by the $\Delta E$, thereupon being able to obtain an associated calibrated energy spectrum (L3, L3') such that the most probabilities are in agreement.

Further, an energy spectrum L1a can be obtained in which a scale of the y-axis indicating the frequency of counts in the energy distribution (L1) of the particle obtained above is changed so as to be matched with the calibrated energy spectrum (L3, L3') obtained above.

Further, a statistical fluctuation L2 of the radiation detector can be obtained by using the calibrated energy spectrum (L3, L3') obtained above and the energy spectrum L1a obtained above.

The present invention also provides a computer program for estimating a particle emitted from a radioisotope source, including a step of obtaining an energy distribution (L1) of the particle emitted outside the radioisotope source by treating a histogram obtained from a relationship between a difference $\Delta E$ between an energy of a particle emitted outside a radioisotope source and an initial energy which the particle possesses at the time of generation and a count as being asymmetric when an energy of a particle emitted from the radioisotope source is obtained by a detector, and estimating an energy deposited while a particle passes through inside the radioisotope source.

Further, the present invention provides a computer program for estimating an energy deposited while a particle passes through inside a radioisotope source and correcting an estimation in a conventional estimation device that includes a memory part on which an estimation program, which does not estimate an energy deposited while the particle passes through inside the radioisotope source, is unrewritably written and a processing part for the estimation program, the computer program estimating the particle emitted from the radioisotope source based on a method of estimating an energy deposited while the particle passes through inside the radioisotope source and correcting, the computer program being written on another memory part other than the memory part.

Further, the present invention provides a computer program for estimating an energy deposited while a particle passes through inside a radioisotope source and correcting by writing or rewriting an estimation program on a memory part of an estimation device which includes a processing part for the estimation program and does not estimate an energy deposited while the particle passes through inside the radioisotope source, the computer program being rewritably written on the memory part and estimating the particle emitted from the radioisotope source based on a method of estimating an energy deposited while the particle passes through inside the radioisotope source and correcting.

The present invention also provides an estimation device of a particle emitted from a radioisotope source, obtaining an energy distribution (L1) of the particle emitted outside the radioisotope source by treating a histogram obtained from a relationship between a difference $\Delta E$ between an energy of a particle emitted outside the radioisotope source and an initial energy which the particle possesses at the time of generation and a count as being asymmetric when an energy of a particle emitted from the radioisotope source is obtained by a detector, and estimating and calibrating an energy deposited while the particle passes through inside the radioisotope source.

Herein, the present invention can include a conversion table of an energy deposit in accordance with a type and a shape of the radioisotope source and a calibration means for calibrating the estimated energy deposit.

The present invention also provides a calibration method of a radiation detector using a radioisotope source where an energy of a particle is estimated by the aforementioned estimation method.

The present invention also provides a calibration device of a radiation detector, including the aforementioned estimation device.

The present invention also provides a calibration device of a radiation detector, being installed with the aforementioned computer program.

The present invention also provides a radioisotope source, being estimated by the aforementioned estimation method.

According to the present invention, an energy that is lost when a particle passes through inside a radioisotope source is accurately estimated when the particle is emitted from the radioisotope source, thereupon being able to measure an energy of the particle emitted outside the radioisotope source with accuracy. Thus, an energy can be re-estimated accurately not only for a radioisotope source to be sold in the future but also for a radioisotope source already on the market. Further, energy calibration of a radiation detector already on the market can also be performed with accuracy. The present invention is an important invention that has the potential for revising a variety of radiation data having been measured heretofore, and has the potential for becoming a new international standard of radiation measurement. Accordingly, there is a possibility that a review of results obtained by energy measurement methods of particles emitted from radioisotope sources, radiation dose estimation methods and performance estimation methods of radiation detectors which were invented in past years is required.

BEST MODE FOR CARRYING OUT THE INVENTION

Figure 2:
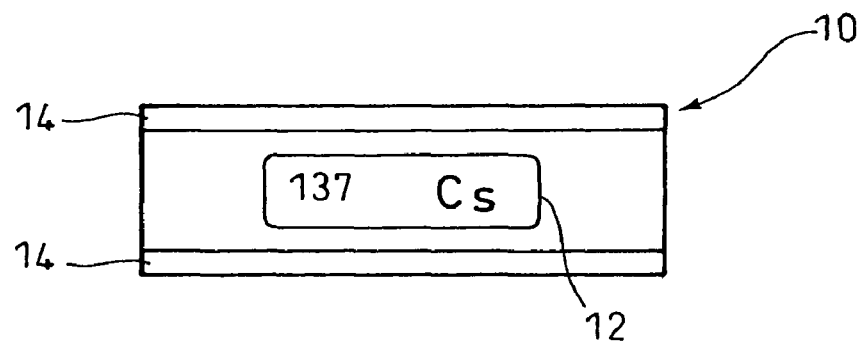
FIG. 2 is a sectional view showing a configuration example of a thin film source.
Figure 3:
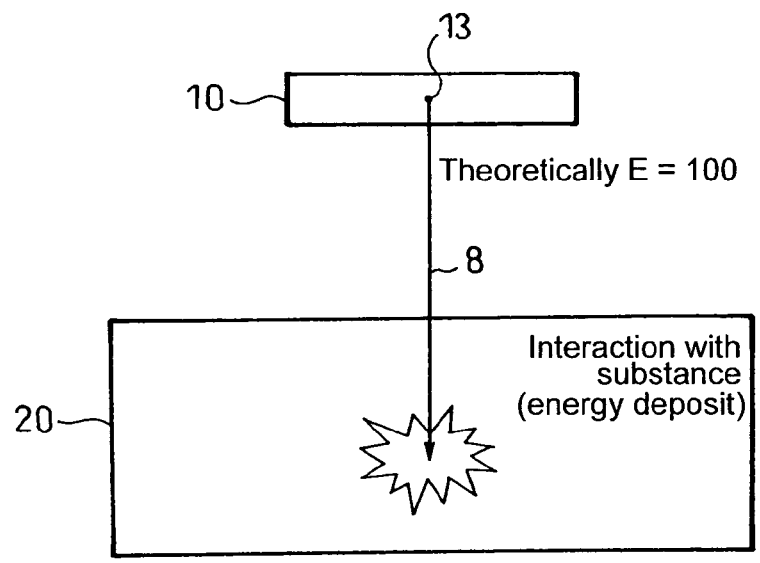
FIG. 3 is a schematic diagram showing a conventional estimation method of a radioisotope source.

Hereinafter, a method of accurately calibrating a radiation detector (a scintillation detector, a semiconductor detector, a gas detector, etc.) with use of a thin film source sold by the Japan Radioisotope Association is described.
[Thin Film Source]
A thin film radioisotope source used in calibration is composed of an isotope 12 serving as a core and two pieces of an upper and a lower fixed isotope protective thin film (aluminum evaporated polyester film at about 1 mg/cm$^2$) 14, as shown in FIG. 2. The film is about 3 μm in terms of thickness. How to estimate an energy deposit of a charged particle in this isotope protective film is an important key to carrying out a correct calibration.

Figure 1:
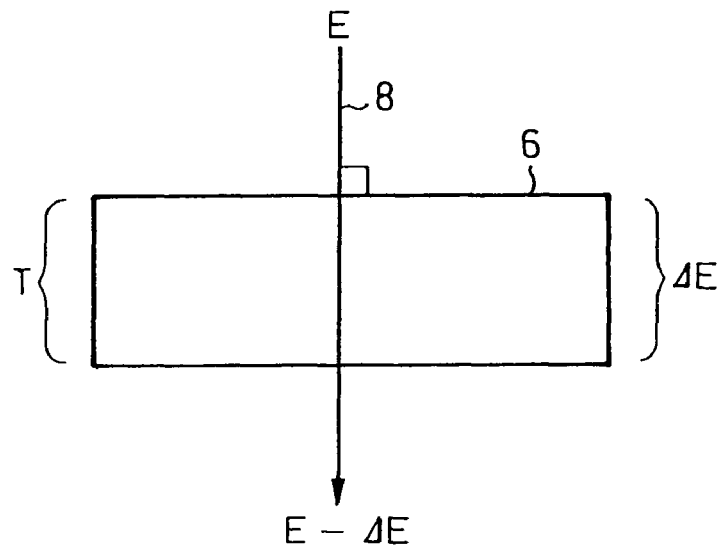
FIG. 1 is a schematic diagram showing a state where a particle is passing through a substance.
Figure 4:
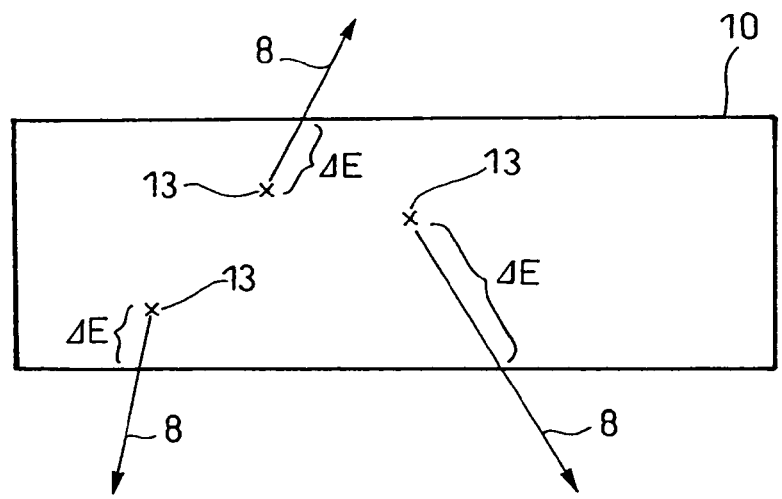
FIG. 4 is a sectional view showing an energy deposit in the radioisotope source.
Figure 5:
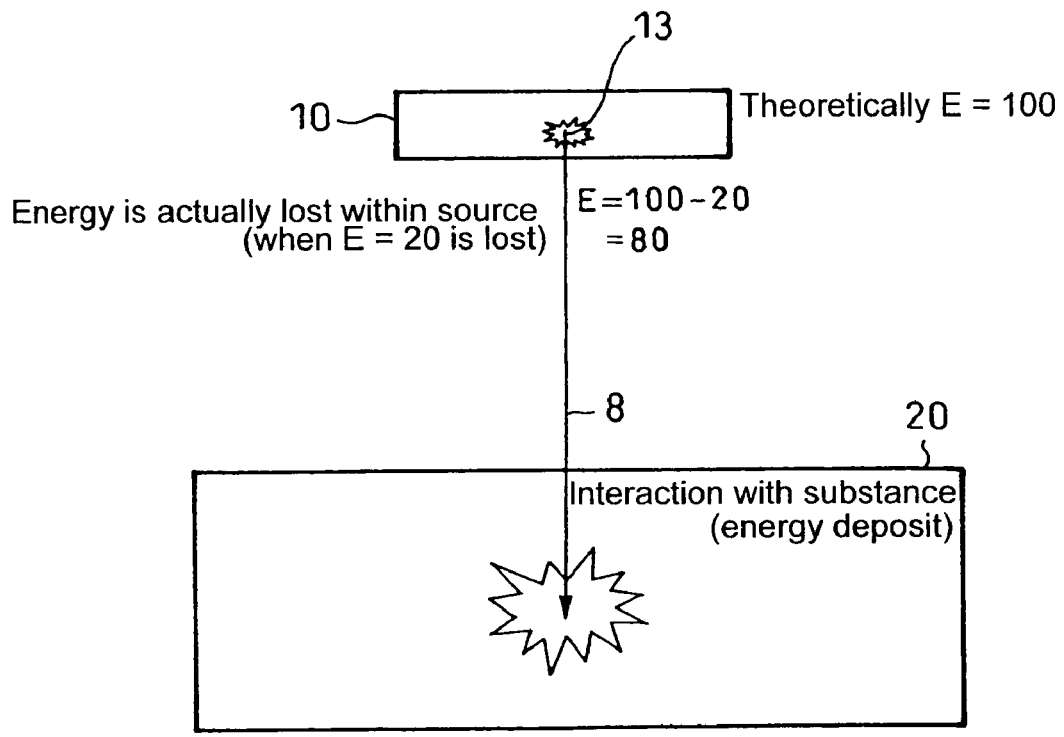
FIG. 5 is a schematic diagram provided for explaining a conventional problem.
Figure 6:
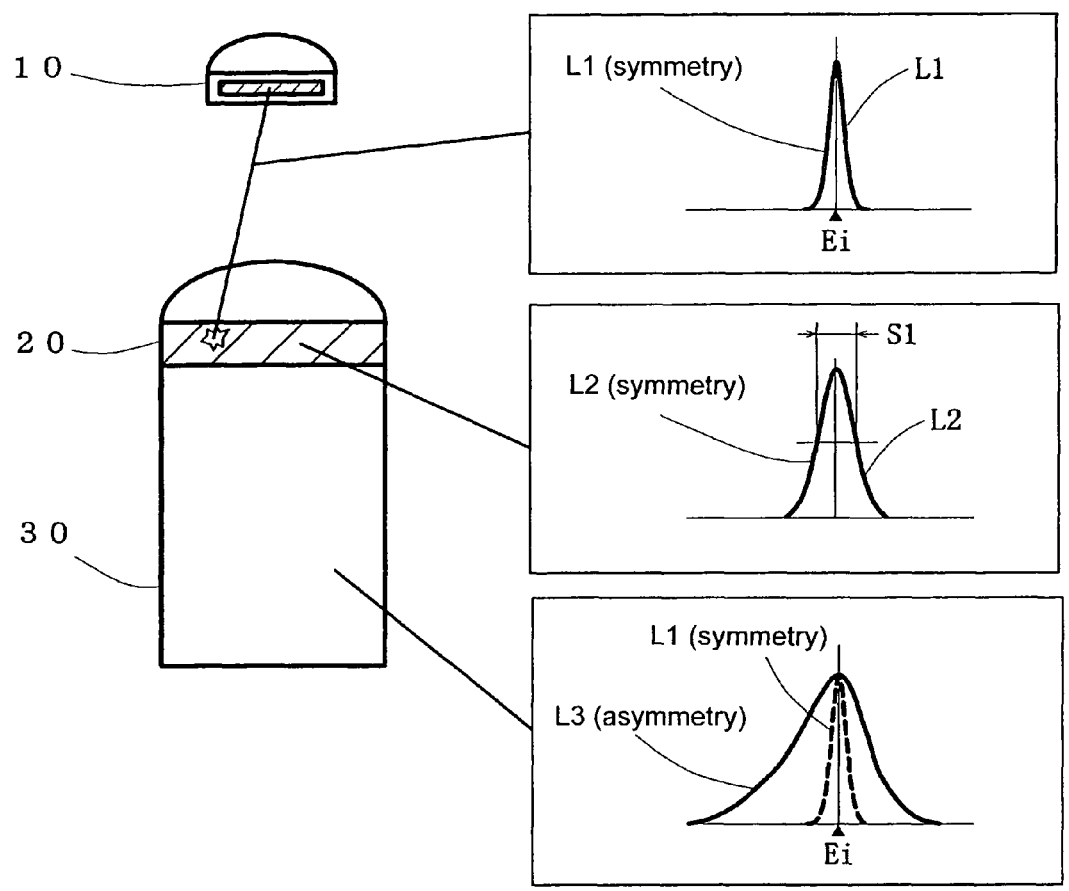
FIG. 6 is a schematic diagram of energy distributions provided for explaining another conventional problem.

Further, it is necessary to carefully consider an energy deposit by the isotope 12 itself since the isotope 12 emitting the charged particle has a volume, as shown in FIG. 4. An isotope ranges not more than 4 nm in thickness and not more than φ5 mm$^2$ in area in the case of a commonly used radioisotope source. Hence, accuracy in performance estimation of the detector can further be improved by estimating an energy deposit of the particle within the isotope together with the energy deposit within the isotope protective film.
[Interaction Between Charged Particle and Substance]
Interaction between a charged particle and a substance has been calculated by Landau, et al. As a result, as shown in FIG. 1, the most probability ΔEp based on an energy deposit within the substance 6 of the charged particle 8 vertically entered into the substance 6 and having an energy E is given by the following formula. That is, an energy is lost within the substance 6 by this ΔEp.

$$\Delta Ep = -W\left\{ ln \frac{2m_0 V_0^2}{I(1-\beta^2)} W - \beta^2 + K \right\} \quad (2)$$

where, $$W \approx 0.075 t \frac{z^2}{\beta^2} \quad (3)$$

Herein, t is an area mass of the substance, z is the number of charges of the charged particle, β is a relative velocity of the charged particle, $m_0 V_0^2$ is 0.511 MeV and K is 0.37.

For example, when a 625.6 keV K shell internal conversion electron emitted from a 137Cs isotope is vertically entered into an aluminum evaporated polyester film (1 mg/cm$^2$) for protecting a radioisotope source, there is an energy deposit of ΔEp=0.9 keV. At this moment, a deviation about 1 keV occurs in the energy of the charged particle emitted from the radioisotope source.

However, actually, a particle emitted from an isotope is radiated isotropically (in 4π direction). In Formula (2) where a calculation is conducted only under the ideal situation of vertical entrance into the substance, a position where the particle is emitted within the isotope and an energy deposit of the particle within not only the isotope but also the isotope protective thin film are disregarded, and accordingly an energy of the particle emitted from the radioisotope source cannot be expressed correctly. It is well known in this field that Formula (2) is not in complete agreement with a result actually obtained by measurement. This is due to the aforementioned reason as well.

Thus, in consideration of an emission angle and an emission location of the particle within the isotope, an energy deposit in the radioisotope source (the isotope and the isotope protective thin film) is simulated to obtain an energy distribution function F(Ei) of the particle emitted outside the radioisotope source.
[Monte Carlo Simulation 1]
The point which becomes important in performing a simulation is to reproduce on a program a radioisotope source to be used in practice as a simulation geometric condition. Herein, the following 6 items shall be the simulation geometric condition.

A) an area, a thickness, a material, a density and a coordinate of the isotope 12

B) an area, a thickness, a material, a density and a coordinate of the isotope protective thin film 14

C) a type of the particle

D) an initial energy of the particle

E) an emission angle of the particle

F) an emission location of the particle

Herein, a simulation is performed assuming that particles are distributed uniformly within the isotope 12 and also emitted in 4π directions.

By way of example, the geometric condition of a 137Cs radioisotope source (a thin film source of 321 type of the Japan Radioisotope Association) was faithfully reproduced, and it was obtained that when a K shell internal conversion electron having an initial energy (Ei) of 625.6 keV was actually emitted outside the radioisotope source, the most probability of an energy of the particle became lower than the initial energy and that an energy distribution of the emitted particle became asymmetric.

Figure 10:
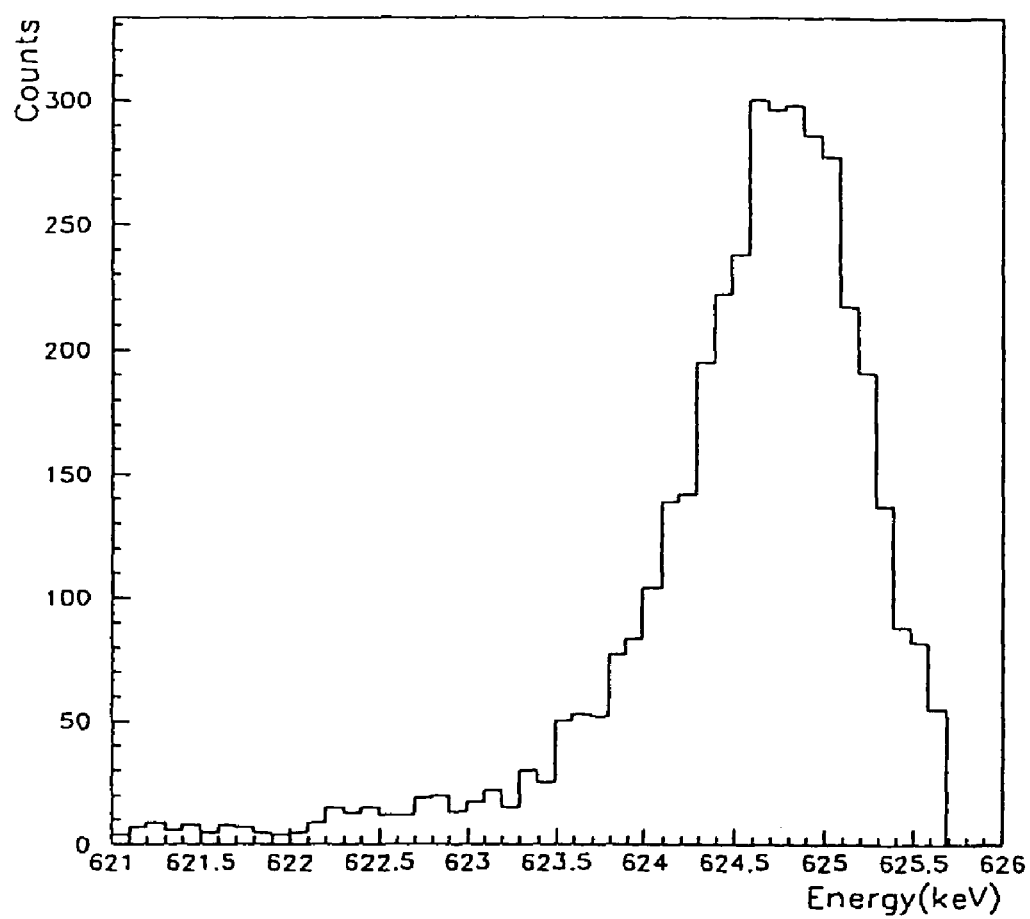
FIG. 10 is also a diagram showing an energy spectrum of a 625.6 keV K shell internal conversion electron emitted from a 137Cs radioisotope source.

FIG. 10 is an energy spectrum of the 625.6 keV K shell internal conversion electron emitted from the 137Cs radioisotope source, obtained as a result of the simulation.

It can be easily recognized that the K shell internal conversion electron whose initial energy is a monoenergetic 625.6 keV has the most probability of the energy about 1 keV lower relative to 625.6 keV due to the energy deposit in the isotope itself and the isotope protective thin film. Further, it is also found that an energy distribution function of the particle is asymmetric (corresponding to L1 in FIG. 7, and the distribution function corresponds to F (Ei) in Formula (1)).

Therefore, an accurate energy estimation of a particle emitted from a radioisotope source radioisotope source, an estimation of a radiation dose and a performance estimation of a radiation detector are impossible unless estimating that (1) an energy of the emitted particle is lower than the initial energy which the particle possesses at the time of generation and (2) an energy distribution of the emitted particle is asymmetric, when the particle emitted from the radioisotope source is correctly handled.

The entire energy of the particle emitted from the radioisotope source is not always able to be detected by the radiation detector. For example, a case where the particle emitted from the radioisotope source passes through the radiation detector without being completely stopped in the radiation detector is included. The present invention allows an accurate energy calibration and performance estimation of a radiation detector (a scintillation detector, a semiconductor detector, a gas detector, etc.) to be made even for such a particular case.

Thus, the present invention is described in two parts; a case where the entire energy of the particle emitted from the radioisotope source is detected by the radiation detector and a case where a part of the energy of the particle emitted from the radioisotope source is detected by the radiation detector.

Figure 7:
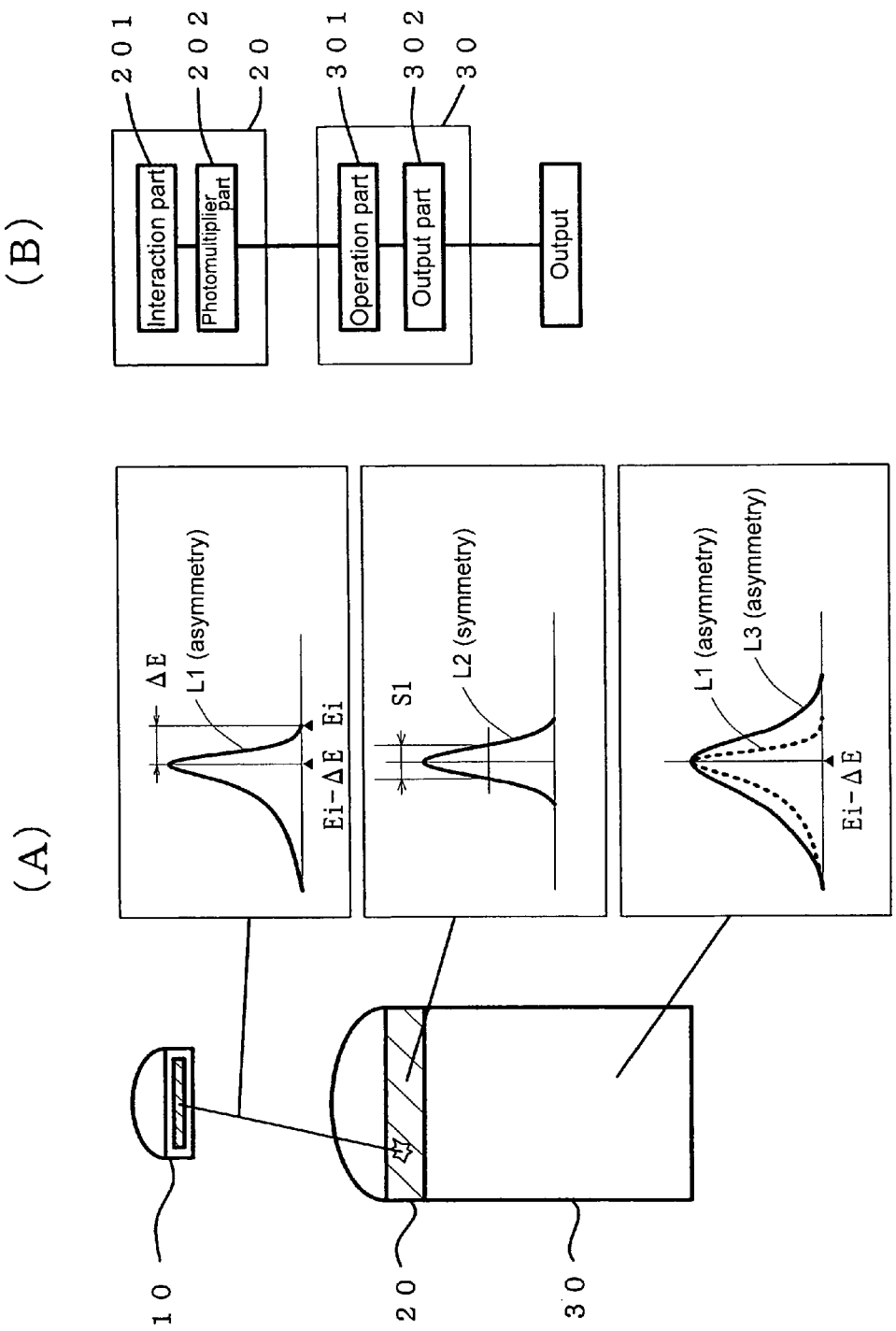
FIG. 7 is a schematic diagram of energy distributions provided for explaining the principle of the present invention.
Figure 8:
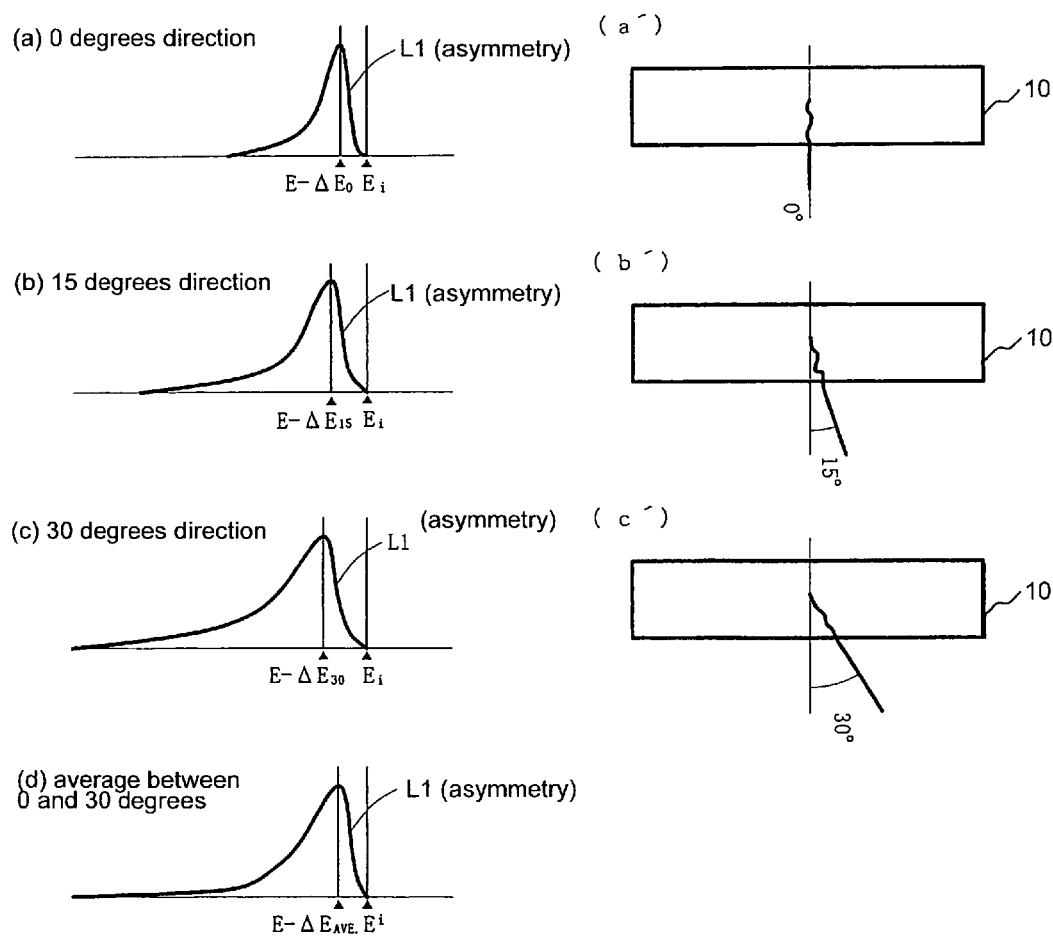
FIG. 8 is also a schematic diagram of emission angles of a particle in the radioisotope source and energy distributions showing a relationship between an energy distribution of the particle emitted outside the radioisotope source and a count.
Figure 9:
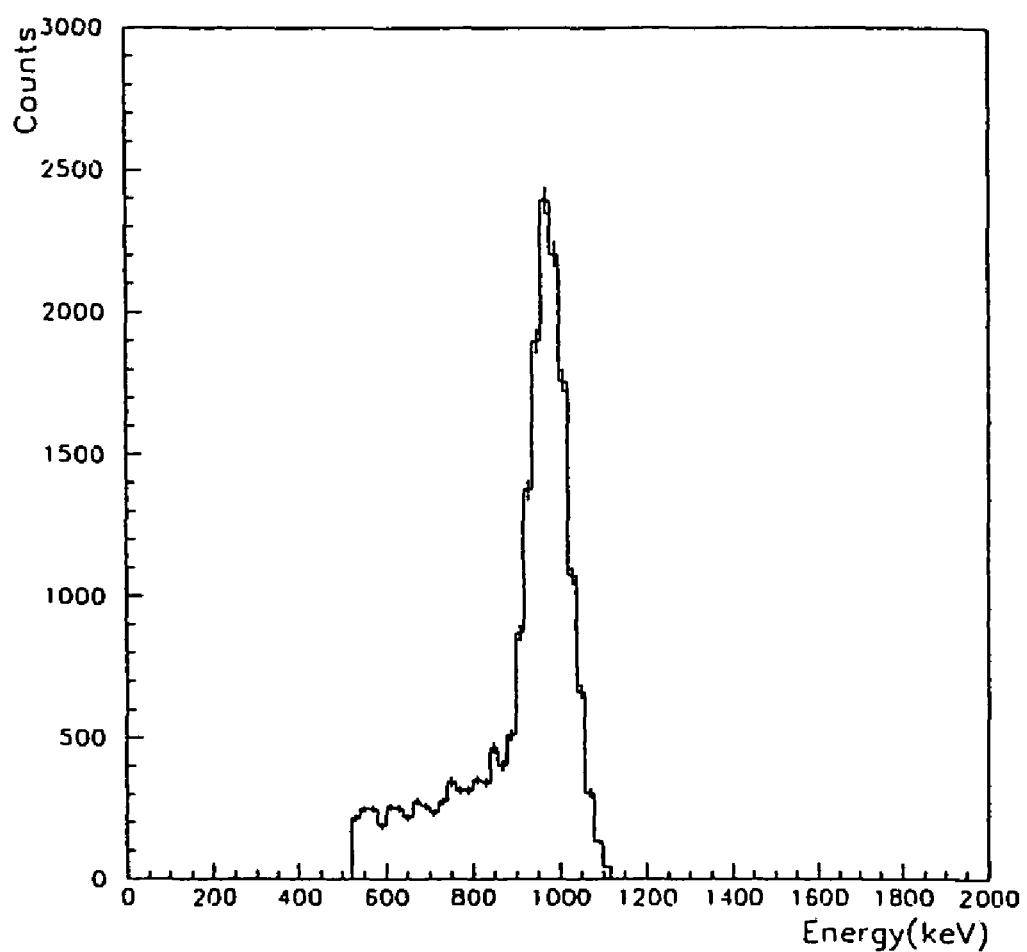
FIG. 9 is also a diagram showing an energy spectrum where a 976 keV K shell internal conversion electron emitted from a 207Bi radioisotope source is measured by a plastic scintillator.
Figure 11:
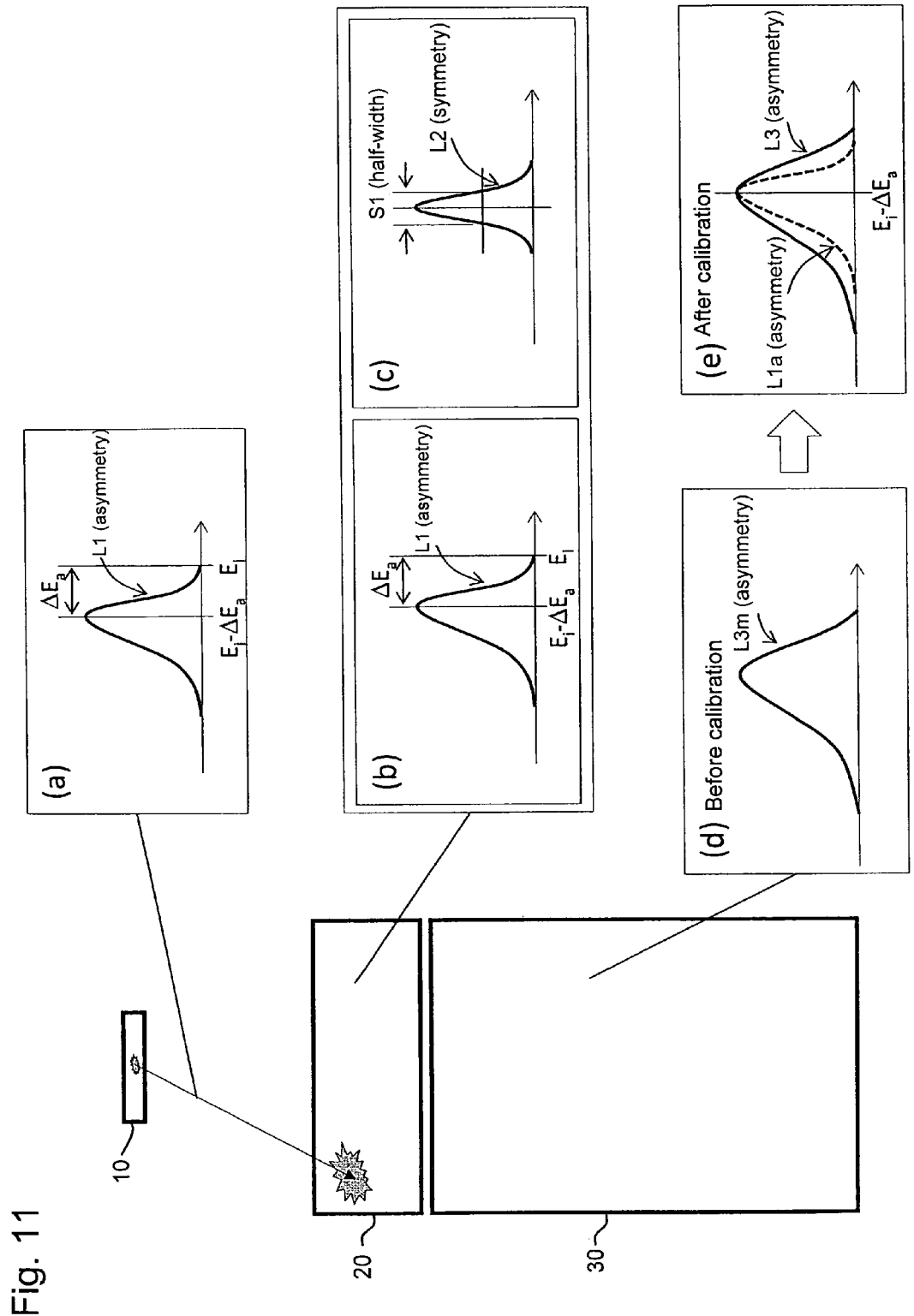
FIG. 11 is a schematic diagram of an energy distribution showing a case where an entire energy of the particle emitted from the radioisotope source is detected by a radiation detector.

FIG. 11 illustrates a case where the entire energy of the particle emitted from the radioisotope source 10 is detected by the same radiation detector 20 as in FIG. 7. Now, an energy distribution in FIG. 11 is described. (a) shows an energy distribution (L1) of the particle emitted from the radioisotope source 10, obtained from the aforementioned simulation. (b) shows an energy spectrum (L1) of the particle detected by the interaction part 201 located in the radiation detector 20. (c) shows a statistical fluctuation (L2) of the photomultiplier part 202 located in the radiation detector 20. (d) shows an actual measurement result (L3m) output from the operation output part 30 by measurement in the radiation detector 20. (e) shows an associated calibrated energy spectrum (L3) such that the most probability of the frequency distribution L3m obtained by measurement is made in agreement with the most probability of L1. More specifically, L3 is a consequence of fixing a 0 point of the x-axis of L3m and changing the scale of x-axis of L3m such that the most probability of L3m is made in agreement with the most probability of L1. Herein, the x-axis of L3 indicates energy intensity.

ΔEa in FIG. 11 indicates the most probability of an energy which the particle generated within the radioisotope source 10 loses within the radioisotope source 10. S1 in FIG. 11(c) indicates a full width at half maximum of the statistical fluctuation by the photomultiplier part 202 in the radiation detector 20.

In FIG. 11, (a) the energy distribution of the particle emitted from the radioisotope source 10 and (b) the energy distribution of the particle detected by the interaction part 201 in the radiation detector 20 equally become L1 since the entire energy of the particle emitted from the radioisotope source 10 is detected by the interaction part 201 located in the radiation detector 20. In addition, the energy distribution L1 of the particle actually emitted outside the radioisotope source 10 has the most probability of the energy shifted to a value (Ei−ΔEa) obtained by subtracting an energy ΔEa that is lost within the radioisotope source 10 from the initial value Ei due to the energy deposit of the particle in the radioisotope source 10.

By fitting the calibrated energy spectrum L3 by R(E) in which L1 is substituted into the energy distribution function F(Ei) of Formula (1), a result L1a of changing the scale of the y-axis indicating the frequency of counts of L1 so as to be matched with L3, and σ in Formula (1) are obtained. The entire frequency (area) of this histogram L1a is a radiation dose obtained by the radiation detector. The unit in which the area is divided by a measurement time is becquerel. Estimating a radiation dose emitted from the radioisotope source becomes possible from a particle radiation dose obtained by the radiation detector and a solid angle of the radiation detector covering the radioisotope source.

Further, a value obtained by multiplying the σ by 2.35 is a full width at half maximum S1 indicating a resolution of the radiation detector. In addition, the σ and the initial energy Ei of the particle are substituted into the following in Formula (1), thereby allowing L2 in FIG. 11(c) to be illustrated.

$$G(E) = \frac{1}{\sqrt{2\pi}\,\sigma} e^{\frac{-(E-E_i)^2}{2\sigma^2}} \qquad (4)$$

FIG. 11(e) illustrates a width comparison between the calibrated energy spectrum L3 and the energy spectrum of L1a. A reason why L3 has a wider distribution than L1a herein is that the calibrated energy spectrum L3 consists of L1a and the statistical fluctuation L2 of the photomultiplier part 202 located in the radiation detector 20.

When a part of the energy of the particle emitted from the radioisotope source 10 is detected by the radiation detector 20, it is necessary to estimate an energy deposit of the particle in the radiation detector as well as the energy deposit of the particle in the radioisotope source. Thus, herein, an emission angle and an emission location of the particle in the isotope are estimated, and a simulation is performed in consideration of the energy deposit of the particle in the radiation detector other than the energy deposit of the particle in the radioisotope source (the isotope and the isotope thin film), thereupon obtaining F(Ei) as an energy distribution function of the particle detected by the radiation detector.

[Monte Carlo simulation 2]

The point which becomes important in performing this simulation is to reproduce on a program a radioisotope source and a radiation detector to be used in practice as a simulation geometric condition of the simulation. Herein, the following 7 items shall be the simulation geometric condition.

A) an area, a thickness, a material, a density and a coordinate of the isotope 12

B) an area, a thickness, a material, a density and a coordinate of the isotope protective thin film 14

C) a type of the particle

D) an initial energy of the particle

E) an emission angle of the particle

F) an emission location of the particle

G) an area, a thickness, a material, a density and a coordinate of the interaction part 201 located in the radiation detector 20

Herein as well, a simulation is performed assuming that particles are distributed uniformly within the isotope 12 and also emitted in $4\pi$ directions.

Figure 12:
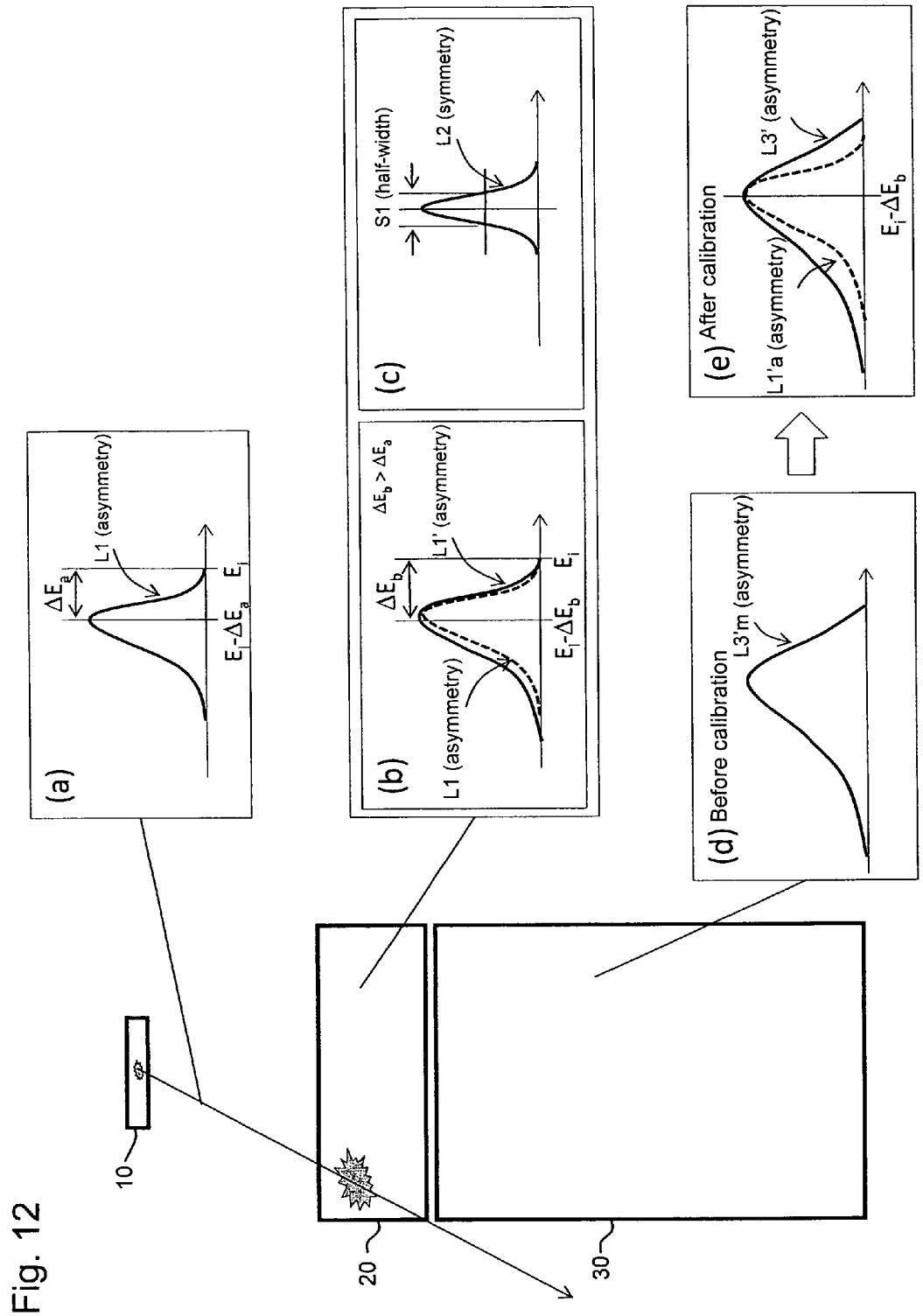
FIG. 12 is a schematic diagram of an energy distribution showing a case where a part of the energy of the particle emitted from the radioisotope source is detected by the radiation detector.

Contrary to FIG. 11, FIG. 12 illustrates a case where a part of the energy of the particle emitted from the radioisotope source 10 is detected by the same radiation detector 20 as in FIG. 7. An energy distribution in FIG. 12 is now described. (a) shows an energy distribution (L1) of the particle emitted from the radioisotope source 10, obtained from the aforementioned Monte Carlo simulation 2 (L1 is identical to L1 in FIG. 11(a)). (b) shows an energy spectrum (L1') of the particle detected by the interaction part 201 located in the radiation detector 20, obtained from the aforementioned Monte Carlo simulation 2. (c) shows a statistical fluctuation (L2) of the photomultiplier part 202 located in the radiation detector 20. (d) shows an actual measurement result (L3'm) output from the operation output part 30 by measurement in the radiation detector 20. (e) shows an associated calibrated energy spectrum (L3') such that the most probability of the frequency distribution L3'm obtained by the measurement is made in agreement with the most probability of L1'. More specifically, L3' is a consequence of fixing a 0 point of the x-axis of L3'm and changing the scale of the x-axis of L3'm such that the most probability of L3'm is made in agreement with the most probability of L1'. Herein, the x-axis of L3' indicates energy intensity.

Herein, $\Delta$Ea in FIG. 12 indicates a value with the highest frequency of an energy which the particle generated within the radioisotope source 10 loses within the radioisotope source 10. Further, $\Delta$Eb indicates the most probability of an energy which the particle emitted from the radioisotope source 10 loses in the interaction part 201 located in the radiation detector 20. S1 in FIG. 12(c) indicates a full width at half maximum of the statistical fluctuation by the photomultiplier part 202 located in the radiation detector 20.

In FIG. 12, only a part of the energy of the particle emitted from the radioisotope source 10 is detected by the interaction part 201 located in the radiation detector 20. Consequently, (a) the energy distribution (L1) of the particle emitted from the radioisotope source and (b) the energy distribution (L1') of the particle detected by the interaction part 201 in the radiation detector 20 are different. As in FIG. 12(b), L1' has a larger deviation from the initial energy Ei than L1 ($\Delta$Eb>$\Delta$Ea) and is widely distributed. This is because the entire energy of the particle emitted from the radioisotope source cannot be detected by the interaction part 201 located in the radiation detector 20.

In addition, the energy distribution L1' of the particle actually detected by the interaction part 201 in the radiation detector 20 has the most probability of the energy shifted to a value (Ei−$\Delta$Eb) obtained by subtracting the energy $\Delta$Eb that is lost in the radioisotope source from the initial energy Ei due to the energy deposit of the particle in the radioisotope source and the energy deposit of the particle in the interaction part 201 of the radiation detector 20.

By fitting the calibrated energy spectrum L3' by R(E) in which L1' is substituted into the energy distribution function F(Ei) of Formula (1), a result L1'a of changing the scale of the y-axis that indicates the frequency of counts of L1' so as to be matched with L3', and $\sigma$ in Formula (1) are obtained. The entire frequency (area) of this histogram L1'a is a radiation dose of the particle obtained by the radiation detector. The unit in which the area is divided by a measurement time is Becquerel. Estimating a radiation dose emitted from the radioisotope source becomes possible from the particle radiation dose obtained by the radiation detector and a solid angle of the radiation detector covering the radioisotope source.

A value obtained by multiplying the $\sigma$ by 2.35 is a full width at half maximum S1 indicating a resolution of the radiation detector. In addition, the $\sigma$ and the initial energy Ei of the particle are substituted into Formula (4) in Formula (1), thereby allowing L2 in FIG. 12(c) to be illustrated.

FIG. 12(e) illustrates a width comparison between the calibrated energy spectrum L3' and the energy spectrum of L1'a. A reason why L3' has a wider distribution than L1'a herein is that the calibrated energy spectrum of L3' consists of L1'a and the statistical fluctuation L2 of the photomultiplier part 202 located in the radiation detector 20.

What is important here is that L2 of the statistical fluctuation of the radiation detector and S1 indicating a resolution of the radiation detector become equal even if it were the case where the entire energy of the particle emitted from the radioisotope source is detected by the radiation detector (FIG. 11) or the case where not detected (FIG. 12).

More specifically, the present invention allows a performance estimation of the radiation detector to be conducted with the same accuracy even if it were the case where the entire energy of the particle emitted from the radioisotope source is detected by the radiation detector (FIG. 11) or the case where not detected (FIG. 12), by using the energy distribution function F(Ei) including the energy deposit of the particle within the radiation detector.

[Resolution of Detector]

A particle emitted from a radioisotope source has often been used in estimating the performance of a radiation detector (for example, a scintillation detector (a scintillator and a photomultiplier device), a semiconductor detector, a gas detector, etc.). However, as shown in FIG. 7, an error may occur in energy calibration of the radiation detector 20 unless it is estimated that the particle emitted outside the radioisotope source has a lower energy than its initial energy at the time of generation due to the energy deposit within the radioisotope source. Further, the performance (resolution and the like) of the radiation detector 20 cannot be estimated accurately unless it is taken into consideration that an energy of the emitted particle shows an asymmetric distribution.

[Estimation of Energy Deposit in Radioisotope Source]

Accordingly, an energy distribution function F(Ei) of the particle emitted outside the radioisotope source is obtained by a simulation relative to a result actually obtained by the radiation detector, thereupon estimating the performance of the detector by the R(E) function of Formula (1).

When there is no energy deposit of the particle in the radioisotope source, the energy distribution function F(Ei) of the particle emitted outside the radioisotope source is a finite value only when Ei=Ej (the initial energy of the particle), and accordingly R(E) becomes the following Gaussian function.

$$R(E) = \frac{1}{\sqrt{2\pi}\,\sigma} e^{\frac{-(E-E_j)^2}{2\sigma^2}} \quad (5)$$

Simulating the energy deposit of the particle in the radioisotope source and using the obtained energy distribution function F(Ei) of the particle and Formula (1) allow a performance estimation of the radiation detector to be made accurately.

[Charged Particle Emitted from Radioisotope Source]

Internal conversion electrons are emitted from electron shells within an atom such as K shell, L shell, M shell. Thus, internal conversion electrons having several different levels of energy are emitted with respect to excitation level of one atom. Accordingly, an internal conversion coefficient for each nucleus is calculated, thereby obtaining a shell and an emission rate.

Figure 13:
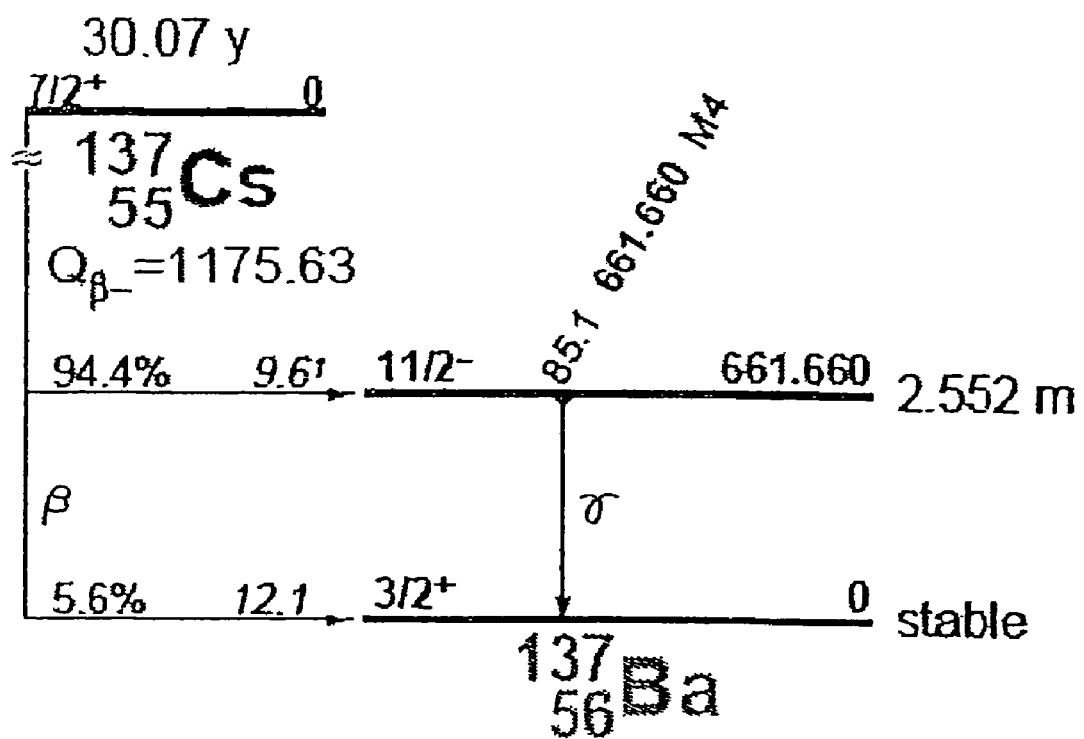
FIG. 13 is a decay scheme of a 137Cs isotope.

For example, internal conversion electrons are primarily emitted mainly from K shell, L1 shell, L2 shell and L3 shell from a 137Cs isotope. Each is emitted with an energy of 625.6 keV, 655.9 keV, 656.3 keV and 656.6 keV, respectively. Thus, respective internal conversion electrons are superposed in a narrow spaced energy region. Further, as a decay scheme in FIG. 13 shows, a plurality of radiations (beta particles, gamma rays) are also emitted from the 137Cs isotope, similar to the internal conversion electrons.

In order to make an accurate calibration of the detector with use of the radioisotope source, an analysis must be performed in which not only principal particles but also internal conversion electrons from each superposed shell, beta particles and gamma rays are estimated.

In the present embodiment, an energy deposit within a source is estimated relative to a group of radiations (internal conversion electrons, beta particles, gamma rays, etc.) individually, an energy distribution function Fk(E) of each group emitted outside the radioisotope source is obtained, an emission rate τk (an internal conversion coefficient, a decay rate) relative to each radiation is estimated, and an energy calibration and a performance estimation of the radiation detector is performed.

Herein, a result obtained at the time of measuring the group of radiations can be expressed by the following formula.

$$R_{total}(E) = \sum_k \tau_k \times R_k(E) = \sum_k \tau_k \times \left( \frac{\int F_k(E_i) \times}{\frac{1}{\sqrt{2\pi}\,\sigma} e^{\frac{-(E-E_i)^2}{2\sigma^2}} dE_i} \right) \quad (6)$$

Where k is an index for identifying each radiation contained in the group of radiations and indicates the number of radiations.

EXAMPLE

Figure 14:
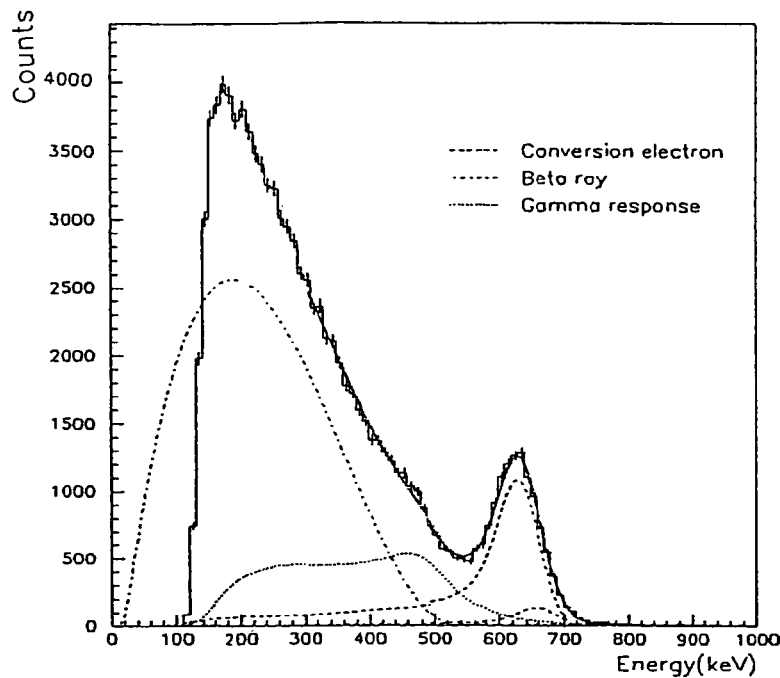
FIG. 14 is a diagram showing a result of measuring a radiation from a 137Cs isotope by the plastic scintillator.
Figure 15:
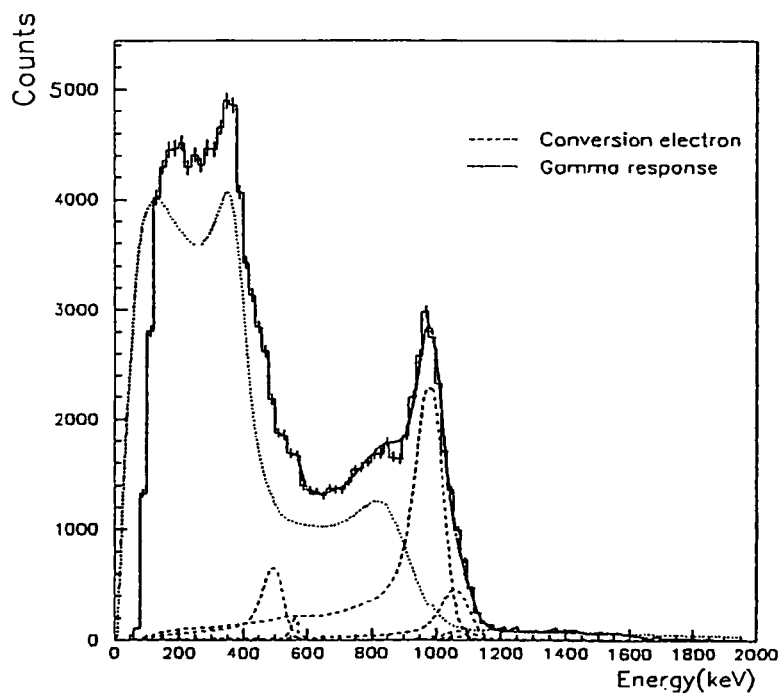
FIG. 15 is a diagram showing a result of measuring a radiation from a 207Bi isotope by the plastic scintillator.

As an example, energy spectra obtained when a group of radiations emitted from a 137Cs and a 207Bi thin film radioisotope source were measured by a plastic scintillator (6.2× 6.2×1 cm³) and a result of detector resolutions estimated with use of Formula (6) are shown in FIG. 14 and FIG. 15, respectively.

As shown in FIG. 14, six radiations in total are mainly emitted from the 137Cs; internal conversion electrons with 625.6 keV from K shell, 655.9 keV from L1 shell, 656.3 keV from L2 shell and 656.6 keV from L3 shell, beta particles with a Q value of 513.9 keV and gamma rays with 661.6 keV. The beta particles, the gamma rays and four beams of the internal conversion electrons having different levels of energy are classified in FIG. 14.

From the 207Bi isotope, as shown in FIG. 15, twelve radiations in total are mainly emitted; a group of internal conversion electrons with 975.6 keV from K shell, 1047.8 keV from L1 shell, 1048.4 keV from L2 shell and 1050.6 keV from L3 shell, a group of internal conversion electrons with 481.6 keV from K shell, 553.8 keV from L1 shell, 554.5 keV from L2 shell and 556.6 keV from L3 shell, and gamma rays with 569.7 keV, 1063.6 keV and 1770.2 keV. A total of eleven beams, i.e. three beams of gamma rays and eight beams of internal conversion electrons having different levels of energy, are separated in FIG. 15.

As obvious from FIG. 14 and FIG. 15, an accurate estimation can be performed irrespective of the type of particles (electrons, beta particles, gamma rays, etc.) as well as a difference in energy of particles.

By estimating each radiation superposed in the narrow spaced region and an energy deposit within the thin film, it was found that an energy resolution of the plastic scintillator was σ=4.73±0.04% (its full width at half maximum was 11.1% FWHM with σ×2.35 and this full width at half maximum corresponds to S1 in FIG. 7) relative to the internal conversion electron having 625.6 keV of 137Cs, and σ=3.84±0.06% (its full width at half maximum was 9.0% FWHM with σ×2.35 and this full width at half maximum corresponds to S1 in FIG. 7) relative to the internal conversion electron having 975.6 keV of 207Bi.

Hereinafter, a specific embodiment is described in detail.

Figure 16:
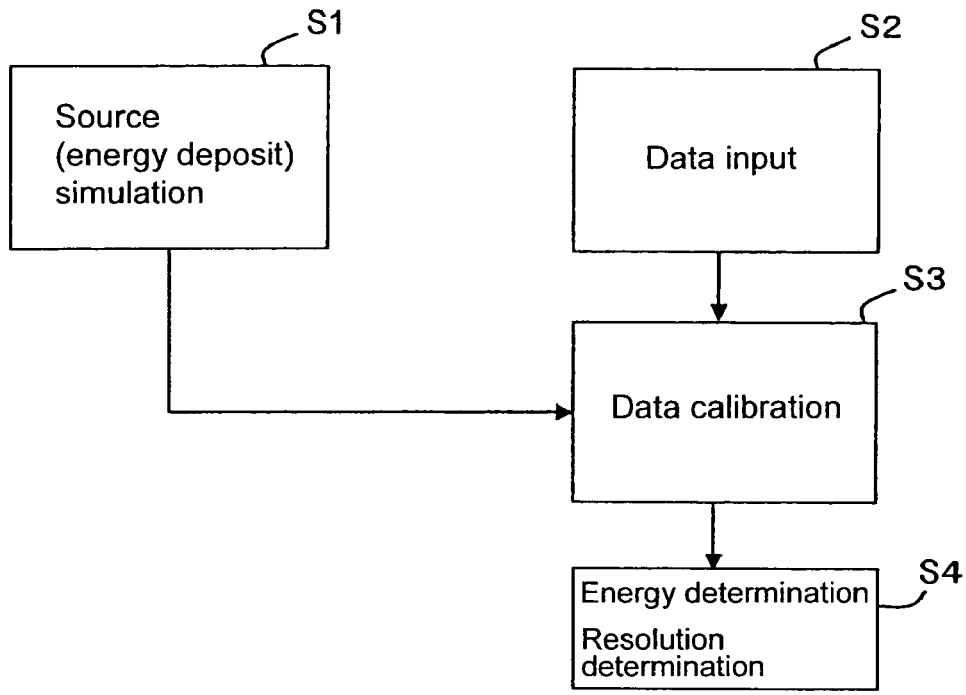
FIG. 16 is a block diagram showing a procedure of an embodiment of the present invention.

A processing of the embodiment is performed following the procedure of performing the aforementioned source simulation (step S1), inputting an output result from the radiation detector as data (step S2), calibrating the input data so as to correspond to an energy distribution function of the particle emitted outside the radioisotope source (step S3), the energy distribution function having been obtained by the source simulation (step S1), thereby determining an energy of the particle emitted outside the radioisotope source and a resolution of the radiation detector (step S4), as shown in FIG. 16.

Figure 17:
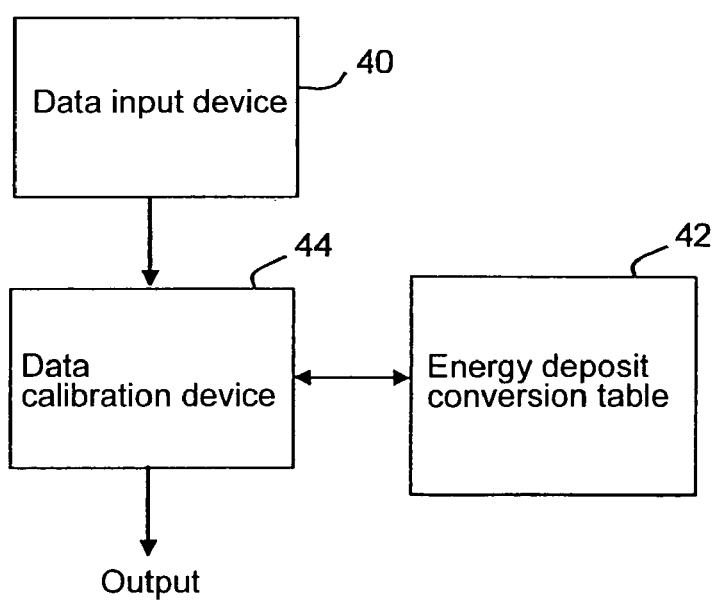
FIG. 17 is a block diagram showing an example configuration of an estimation device for carrying out the present invention.

An example of an estimation device for carrying out the present invention is composed of a data input device 40, a memory device for a lost energy conversion table (hereinafter, simply referred to as a conversion table) 42 for calibrating an energy deposit obtained by the source simulation, in accordance with a type and a shape of the radioisotope source, and a data calibration device 44 calibrating the data input from the data input device 40 with use of the conversion table 42, as shown in FIG. 17.

Figure 18:
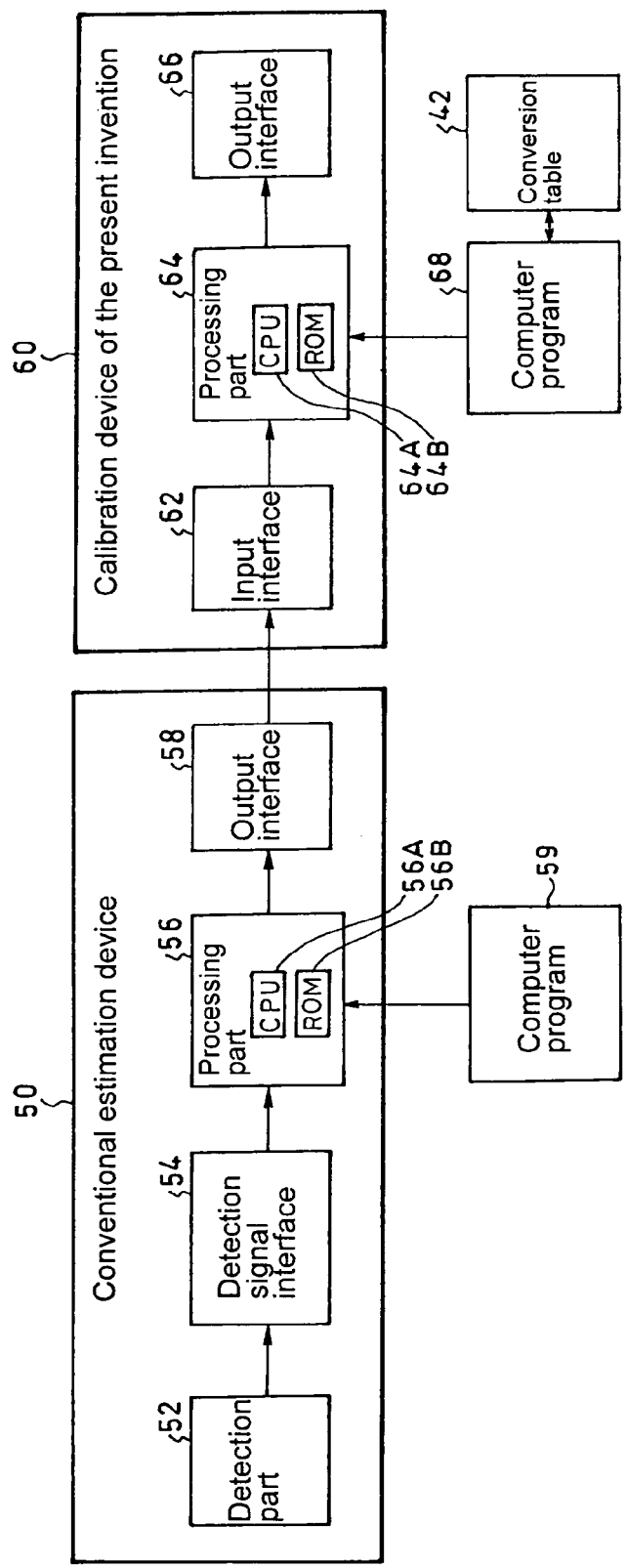
FIG. 18 is a block diagram showing an example configuration of a calibration device for carrying out the present invention.

A configuration of an example 60 of a calibration device for carrying out the present invention, suitable for use of a conventional estimation device 50 in which a program for estimating an energy of a particle emitted from a radioisotope source based on a conventional method is unrewritably written on a memory part is shown in FIG. 18. In FIG. 18, 52 is a detection part composed of a scintillation detector, a semiconductor device, a gas detector, etc., 54 is a detection signal interface delivering a detection signal such as an electrical signal output from the detection part 52 in a suitable form on the subsequent stage, 56 is a processing part including, for example, a CPU 56A and a ROM 56B, 58 is an output interface and 59 is a computer program based on the conventional technique and written on the ROM 56B, which are all included in the conventional estimation device 50. 62 is an input interface, 64 is a processing part including, for example, a CPU 64A and a ROM 64B, 66 is an output interface, 68 is a computer program based on the technique of the present invention and written on the ROM 64B and 42 is a conversion table, which are all included in the calibration device 60 of the present invention. The computer program 68 is a program that corrects an estimation value output from the output interface 58 of the conventional estimation device 50, based on the technique of the present invention.

Figure 19:
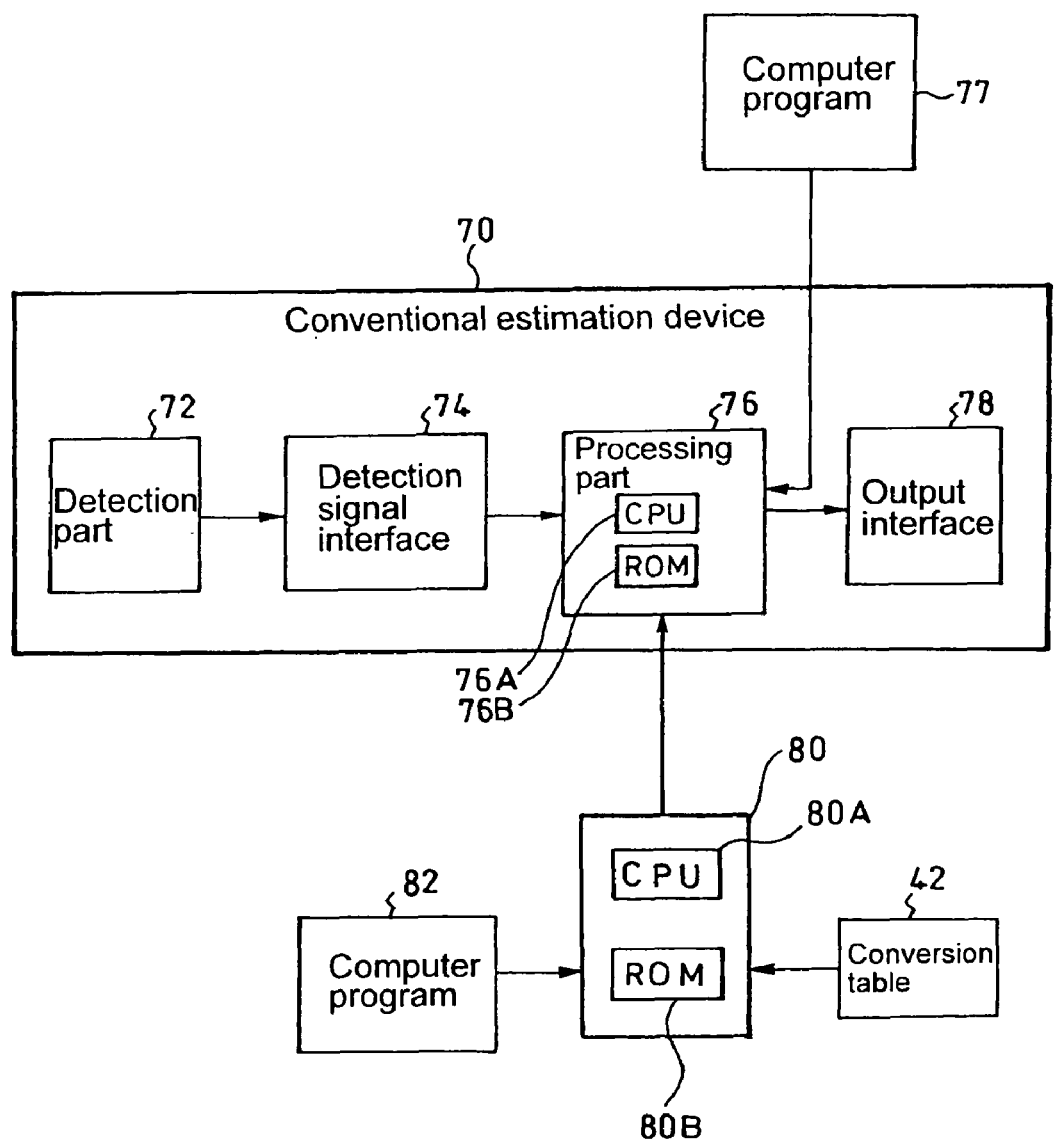
FIG. 19 is a block diagram showing another example configuration of the calibration device for carrying out the present invention.

A configuration of an example 80 of the calibration device for carrying out the present invention, suitable for use of a conventional estimation device 70 in which a program for estimating an energy of a particle emitted from a radioisotope source based on the conventional method is rewritably written on a memory part is shown in FIG. 19. In FIG. 19, 72 is a detection part composed of a scintillation detector, a semiconductor device, a gas detector, etc., 74 is a detection signal interface delivering a detection signal such as an electrical signal output from the detection part 72 in a suitable form on the subsequent stage, 76 is a processing part including, for example, a CPU 76A and a ROM 76B, 77 is a computer program based on the conventional technique and 78 is an output interface, which are all included in the conventional estimation device 70. 80A is a CPU, 80B is a ROM, 82 is a computer program based on the technique of the present invention and 42 is a conversion table, which are all included in the calibration device 80 of the present invention.

The computer program 82 based on the technique of the present invention is such a program that rewrites an entire or part of the program 77 based on the conventional technique and written on the ROM 76B or that additionally writes. The computer program 82 can be preprogrammed based on the program written on the ROM 76B and be written on the ROM 80B in advance.

Further, the conventional computer program written on the ROM 76B can be configured to be once read into a personal computer in which the computer program 82 based on the technique of the present invention is written, processed by the CPU 80A based on the computer program 82, rewritten into the technique of the present invention, and then returned to the ROM 76B.

In addition, the ROMs 56B, 64B, 76B and 80B can be configured to be on-board with respective CPUs, or connected via an interface. Alternatively, the ROMs can be substituted by a hard disk or another memory means.

Since the conversion table 42 is used in each of the aforementioned examples, the energy deposit in accordance with a type and a shape of the radioisotope source can be prepared in advance, and accordingly the processing is facilitated and becomes speedy. In addition, the estimation can be corrected by a method other than the conversion table such as a calculation method with use of a formula.

Further, Monte Carlo simulations are adopted in the above description, but a simulation method is not limited to them.

Further, the radioisotope source which is a target of estimation is not limited to the thin film radioisotope source. The present invention is similarly applicable to, for example, a variety of radioisotope sources as introduced in FIG. 17.1, FIG. 17.2, FIG. 17.3, FIG. 17.4, FIG. 17.5, FIG. 17.6, FIG. 17.7, FIG. 17.8, etc., of Handbook of Radioisotopes, 3rd revision (published on Dec. 20, 1984, editor: Japan Radioisotope Association, publisher: Kumao Ebihara, publishing office: MARUZEN, Co., Ltd.) by setting a shape, a size, a material and a density of a radioisotope source and a type and an energy of an emitted particle in each simulation condition.

Making use of the technique of the present invention allows for manufacturing of a radioisotope source in which energy of a particle is accurately estimated. Further, it allows for an accurate calibration or estimation of an energy of a particle of the radioisotope source.

Further, the radiation detector which is a target of calibration is also not limited to the plastic scintillator.

[Industrial Applicability]

The present invention can be used for an estimation of a particle emitted from a radioisotope source and a calibration of a radiation detector.

The invention claimed is:

1. An estimation method of a particle emitted from a radioisotope source, the method comprising:
    obtaining an energy distribution (L1) of the particle emitted outside the radioisotope source by treating a histogram obtained from a relationship between a difference $\Delta E$ between an energy of a particle emitted outside the radioisotope source and an initial energy which the particle possesses at the time of generation and a count as being asymmetric when an energy of a particle emitted from the radioisotope source is obtained by a detector;
    estimating an energy deposited while the particle passes through inside the radioisotope source; and
    calibrating the energy deposit that has been estimated.

2. The estimation method of the particle emitted from the radioisotope source according to claim 1, wherein the energy deposit in the radioisotope source is estimated by obtaining a travel distance of a particle in the radioisotope source from an occurrence location and an emission direction of the particle within the radioisotope source.

3. The estimation method of the particle emitted from the radioisotope source according to claim 2, wherein the travel distance includes a travel distance from the radioisotope source to an interaction part of a radiation detector.

4. The estimation method of the particle emitted from the radioisotope source according to claim 2, wherein the emission direction of the particle is set isotropically.

5. The estimation method of the particle emitted from the radioisotope source according to claim 1, wherein the particle is a charged particle.

6. The estimation method of the particle emitted from the radioisotope source according to claim 1, wherein the radioisotope source is a thin film radioisotope source (a radioisotope source emitting an internal conversion electron), a beta source or an alpha source.

7. A calibration method of a radiation detector, comprising using a radioisotope source where an energy of a particle is estimated by an estimation method according to claim 1.

8. A radioisotope source comprising being estimated by an estimation method according to claim 1.

9. An estimation method of a particle emitted from a radioisotope source, the method comprising:
    obtaining an energy distribution (L1) of the particle emitted outside the radioisotope source by treating a histogram obtained from a relationship between a difference $\Delta E$ between an energy of a particle emitted outside the radioisotope source and an initial energy which the particle possesses at the time of generation and a count as being asymmetric when an energy of a particle emitted from the radioisotope source is obtained by a detector; and
    estimating an energy deposited while the particle passes through inside the radioisotope source,
        wherein the energy deposit in the radioisotope source is estimated by obtaining a travel distance of a particle in the radioisotope source from an occurrence location and an emission direction of the particle within the radioisotope source, and the energy deposit within the radioisotope source is obtained by using an energy distribution function F(Ei) of the particle emitted outside the radioisotope source, which is obtained by estimation, and a response function R(E) shown by the following formula;

$$R(E) = \int F(E_i) \times \frac{1}{\sqrt{2\pi}\,\sigma} e^{\frac{-(E-E_i)^2}{2\sigma^2}} dE_i \quad (1)$$

where E is an energy of the particle, Ei is an initial energy which the particle possesses at the time of generation, and σ is a standard deviation and indicates a resolution of the detector.

10. An estimation method of a particle emitted from a radioisotope source, the method comprising:
obtaining an energy distribution (L1) of the particle emitted outside the radioisotope source by treating a histogram obtained from a relationship between a difference ΔE between an energy of a particle emitted outside the radioisotope source and an initial energy which the particle possesses at the time of generation and a count as being asymmetric when an energy of a particle emitted from the radioisotope source is obtained by a detector; and
estimating an energy deposited while the particle passes through inside the radioisotope source,
wherein the energy deposit in the radioisotope source is estimated by obtaining a travel distance of a particle in the radioisotope source from an occurrence location and an emission direction of the particle within the radioisotope source, and
the energy deposit of the particle within the radioisotope source is obtained by obtaining a distribution function Fk(E) based on an energy deposit within the radioisotope source individually relative to a group of radiations (internal conversion electrons from each shell, beta particles, gamma rays, etc), and estimating an emission rate τk of each radiation (where k is an index for identifying each radiation contained in the group of radiations and indicates the number of radiations).

11. An estimation method of a particle emitted from a radioisotope source, the method comprising:
obtaining an energy distribution (L1) of the particle emitted outside the radioisotope source by treating a histogram obtained from a relationship between a difference ΔE between an energy of a particle emitted outside the radioisotope source and an initial energy which the particle possesses at the time of generation and a count as being asymmetric when an energy of a particle emitted from the radioisotope source is obtained by a detector;
estimating an energy deposited while the particle passes through inside the radioisotope source; and
calibrating an energy spectrum measured by the radiation detector by the ΔE; and
obtaining an associated calibrated energy spectrum (L3, L3') such that most probabilities are made in agreement.

12. An estimation method of a radiation detector according to claim 11, further comprising:
obtaining an energy spectrum L1a in which a scale of counts of the energy distribution (L1) of the particle obtained is changed so as to be matched with the calibrated energy spectrum (L3, L3').

13. An estimation method of a radiation detector according to claim 12, further comprising obtaining a statistical fluctuation L2 of the radiation detector with use of the calibrated energy spectrum (L3, L3') and the energy spectrum L1a.

14. A computer readable medium storing a computer program for estimating a particle emitted from a radioisotope source, comprising:
including a step of obtaining an energy distribution (L1) of the particle emitted outside the radioisotope source by treating a histogram obtained from a relationship between a difference ΔE between an energy of a particle emitted outside the radioisotope source and an initial energy which the particle possesses at the time of generation and a count as being asymmetric when an energy of a particle emitted from the radioisotope source is obtained by a detector;
estimating an energy deposited while the particle passes through inside the radioisotope source; and
calibrating the energy deposit that has been estimated.

15. The computer readable medium storing a computer program according to claim 14 for estimating and correcting an energy deposited while the particle passes through inside the radioisotope source by writing or rewriting an estimation program on a memory part of an estimation device which includes a processing part for the estimation program and does not estimate an energy deposited while the particle passes through inside the radioisotope source, the estimation program being rewritably written on the memory part and estimating the particle emitted from the radioisotope source based on a method of not estimating an energy deposited while the particle passes through inside the radioisotope source.

16. A calibration device of a radiation detector, comprising being installed with a computer program according to claim 14.

17. A computer readable medium storing a computer program for estimating a particle emitted from a radioisotope source, comprising:
including a step of obtaining an energy distribution (L1) of the particle emitted outside the radioisotope source by treating a histogram obtained from a relationship between a difference ΔE between an energy of a particle emitted outside the radioisotope source and an initial energy which the particle possesses at the time of generation and a count as being asymmetric when an energy of a particle emitted from the radioisotope source is obtained by a detector;
estimating an energy deposited while the particle passes through inside the radioisotope source; and
correcting an estimation in a conventional estimation device which includes another memory part on which an estimation program for estimating the particle emitted from the radioisotope source based on a method of not estimating an energy deposited while the particle passes through inside the radioisotope source, is unrewritably written and a processing part for the estimation program and does not estimate an energy deposited while the particle passes through inside the radioisotope source.

18. An estimation device of a particle emitted from a radioisotope source, comprising:
means for obtaining an energy distribution (L1) of the particle emitted outside the radioisotope source by treating a histogram obtained from a relationship between a difference ΔE between an energy of a particle emitted outside the radioisotope source and an initial energy which the particle possesses at the time of generation and a count as being asymmetric when an energy of a particle emitted from the radioisotope source is obtained by a detector;

means for estimating and calibrating an energy deposited while the particle passes through inside the radioisotope source; and means for calibrating the energy deposit that has been estimated.

19. A calibration device of a radiation detector, comprising an estimation device according to claim 18.

20. An estimation device of a particle emitted from a radioisotope source, comprising:

means for obtaining an energy distribution (L1) of the particle emitted outside the radioisotope source by treating a histogram obtained from a relationship between a difference ΔE between an energy of a particle emitted outside the radioisotope source and an initial energy which the particle possesses at the time of generation and a count as being asymmetric when an energy of a particle emitted from the radioisotope source is obtained by a detector;

means for estimating and calibrating an energy deposited while the particle passes through inside the radioisotope source;

a conversion table for an energy deposit in accordance with a type and a shape of the radioisotope source; and a calibration means for calibrating the estimated energy deposit.

* * * * *